(12) United States Patent
Christensen et al.

(10) Patent No.: US 6,915,364 B1
(45) Date of Patent: Jul. 5, 2005

(54) AUTOMATICALLY DOWNLOADED LINK ACTIVE SCHEDULE

(75) Inventors: Daniel D. Christensen, Austin, TX (US); Kenneth D. Krivoshein, Elgin, TX (US); Larry O. Jundt, Round Rock, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/345,809

(22) Filed: Jul. 2, 1999

(51) Int. Cl.[7] .................. G06F 13/00; G06F 19/00; G06F 11/00

(52) U.S. Cl. .................. 710/104; 700/21; 700/100; 714/7; 702/188

(58) Field of Search .................. 710/15; 709/220; 700/32, 17, 11; 714/23; 455/8; 702/188

(56) References Cited

U.S. PATENT DOCUMENTS

| | | | | |
|---|---|---|---|---|
| 5,426,774 A | * | 6/1995 | Banerjee et al. ............. | 710/15 |
| 5,912,814 A | | 6/1999 | Flood .................. | 364/131 |
| 6,014,612 A | * | 1/2000 | Larson et al. ................ | 700/11 |
| 6,095,674 A | * | 8/2000 | Verissimo et al. ............ | 700/32 |
| 6,230,286 B1 | * | 5/2001 | Shapiro et al. ............... | 714/23 |
| 6,263,387 B1 | * | 7/2001 | Chrabaszcz ................ | 709/220 |
| 6,424,872 B1 | * | 7/2002 | Glanzer et al. ............... | 700/17 |
| 6,445,905 B1 | * | 9/2002 | Pentikainen .................. | 455/8 |

FOREIGN PATENT DOCUMENTS

| | | |
|---|---|---|
| EP | 0 460 308 A1 | 12/1991 |
| WO | WO 91/08535 | 6/1991 |
| WO | WO 98/14853 | 4/1998 |
| WO | WO 99/32947 | 7/1999 |

OTHER PUBLICATIONS

Fisher–Rosemount Systems, "Fieldbus Technical Overview Understanding FOUNDATION™ Fieldbus Technology," 27 pages, 1997.

Fieldbus Foundation™, "Technical Overview," FD–043, Revision 1.0, 29 pages, 1996.

Fieldbus Foundation Manual, 1996–1997, including Fieldbus Message Specification FF–870 Rev. 1.1; Common File Format FF–103 Rev. PS 4.0; 31.25 kbits/s Physical Layer Conformance Test FF–830, Rev. FS 1.0; Device Description Language FF–900 Rev. 1.0; Function Block Application Process (Part 1) FF–890 Rev 1.2; Fieldbus Access Sublayer FF–875 Rev 1.1; Function Block Application Process (Part 2) FF–891 Rev. 1.2; Data Link Protocol Specification FF–822 Rev. 1.1; System Management FF–880 Rev. 1.1; Communication Profile FF–940 Rev. FS 1.0; Transducer Block Application Process (Part 1) FF–902 Rev. PS 2.0; Transducer Block Application Process (Part 2) FF–903 Rev. PS 2.0; Data Link Services Subset FF–821 Rev. 1.0; 31.25 kbit/s Physical Layer Profile FF–816 Rev. 1.0; Network Management FF–801 Rev 1.1; and System Architecture FF–800 Rev 1.0.

Copy of Search Report Issued by United Kingdom Patent Office regarding search dated Nov. 9, 2000.

Examination Report under Section 18(3) issued in GB application 0013726.5, dated Jul. 14, 2003.

* cited by examiner

Primary Examiner—Mark H. Rinehart
Assistant Examiner—Christopher E. Lee
(74) Attorney, Agent, or Firm—Marshall, Gerstein & Borun LLP (57) ABSTRACT

A system and method for managing delivery of a link active schedule has a master link active scheduler and a backup link active scheduler communicatively coupled together via a databus. The system and method stores a link active schedule in a master link active scheduler and automatically transmits the most current link active schedule from the master link active scheduler over the databus to the backup link active scheduler upon receipt of the link active schedule in the master link active scheduler.

26 Claims, 4 Drawing Sheets

AUTOMATICALLY DOWNLOADED LINK ACTIVE SCHEDULE

FIELD OF THE INVENTION

The present invention relates generally to process control networks and, more specifically, to a system and method for providing and updating a link active schedule to a backup device within a process control system.

DESCRIPTION OF THE RELATED ART

Modern process control systems are typically microprocessor-based distributed control systems (DCSs). A traditional DCS configuration includes one or more user interface devices, such as workstations, connected by a databus (e.g., Ethernet) to one or more controllers. The controllers are generally physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller having an appropriate control algorithm and which is connected to appropriate sensors, actuators, etc. Alternatively, if the user desires to modify an existing process, new control parameters or control algorithms may, for example, be downloaded from the user interface to an appropriate controller via the databus.

To provide for improved modularity and inter-manufacturer compatibility, process controls manufacturers have more recently moved toward even further decentralization of control within a process. These more recent approaches are based on "smart" field devices that communicate using an open protocol such as the HART®, PROFIBUS®, WORLDFIP®, Device-Net®, CAN, and FIELDBUS® protocols. These smart field devices are essentially microprocessor-based devices such as sensors, actuators, etc. that, in some cases, such as with Fieldbus devices, also perform control loop functions traditionally executed by a DCS controller. Because some smart field devices provide control capability and communicate using an open protocol, field devices from a variety of manufacturers can communicate with one another on a common digital databus and can interoperate to execute a control loop without the intervention of a traditional DCS controller.

The Fieldbus communication protocol is one particularly popular open communication protocol that is used by some smart field devices. As is generally known, Fieldbus provides both synchronous (i.e., scheduled) communications and asynchronous (i.e., token ring type) communications on a protocol bus, these communications being performed according to a bus schedule created by the system designer. The schedule may define when each device or software component within a device can communicate on the bus, when different components should execute, when asynchronous communications takes place, etc. In general, the scheduled/synchronous communications are used for signals related to actual process control activities while the asynchronous communications are used to convey secondary information, for example, to and from a user or other activities not directly necessary for process control.

Although these new open protocol process control systems based on smart field devices eliminate or reduce the necessity for a traditional DCS controller, as noted above, a scheduling function is required to coordinate and synchronize the interoperation of the smart field devices and the communications over a bus or other communication lines used by the devices conforming to the protocol. This scheduling function is commonly performed by a link active scheduler (LAS) connected to or associated with the protocol bus. Each protocol bus typically includes at least one device that acts as a master LAS and may additionally include one or more backup devices that are capable of receiving and storing LAS schedule information for backup purposes. One of the backup devices automatically becomes active when the master LAS fails to thereby assure continued operation of the bus or devices connected to the bus upon failure of the master LAS.

Presently, when a user makes changes to a process control system, a new link active schedule is created and downloaded to the master LAS. However, to assure proper backup operation, the user must also separately download the new LAS schedule information to each of the backup LAS devices on each protocol bus, which requires that the user knows and keeps track of each device operating as a backup LAS on each of the busses and remembers to download the new schedule to each of the backup devices. In current systems, if the user forgets to download the new LAS schedule information to the backup devices, a failure of the master LAS (with the new schedule) can result in failure of the process control loops operating on the protocol bus because the backup version of the link active schedule is not be the most current version and may not reflect the actual control loop configuration.

SUMMARY OF THE INVENTION

In accordance with one aspect of the invention, a method of providing a backup link active schedule for use in controlling communication in a process control system having a master link active scheduler and a backup link active scheduler communicatively coupled together via a databus includes the steps of storing a link active schedule in a master link active scheduler, automatically transmitting the link active schedule from the master link active scheduler over the databus to the backup link active scheduler upon receipt of the link active schedule in the master link active scheduler, and storing the link active schedule in the backup link active scheduler.

The method may also include the step of storing a list of backup link active scheduler devices associated with the databus in the master link active scheduler.

The method may further include the steps of detecting when the backup link active scheduler is unavailable for storage and notifying a user that the backup link active scheduler is unavailable for storage of the link active schedule. The method may also detect a failure to store the link active schedule in at least one backup device and notify a user of the detected failure to store the link active schedule in at least one backup device. The method may also recognize that the backup link active scheduler is no longer communicating on the databus, which may, for example, be accomplished by making a comparison of a list of backup devices on the protocol bus to a list of active devices on the protocol bus, and may notify a user that the backup link active scheduler is no longer communicating on the databus.

In accordance with another aspect of the invention, a system for controlling communications on a databus using a link active schedule includes a master link active scheduler having a memory that stores a link active schedule and a processor programmed to automatically transmit the link active schedule over the databus to a backup device upon receiving the link active schedule. The system also includes a backup link active scheduler in communication with the master link active scheduler via the databus, wherein the backup link active scheduler receives the link active schedule transmitted from the master link active scheduler. If desired, a list of backup devices may be stored in the memory and the processor may be programmed to send the link active schedule to the backup devices identified in the list of backup devices.

In accordance with another aspect of the invention, a system for controlling a process includes a user interface coupled to a first databus, a controller communicatively coupled to the user interface via a first databus, and an I/O device coupled to the controller and a second databus. A plurality of field devices are coupled to the second databus, each of which is adapted to communicate with the I/O device over the second databus. A primary scheduler is also coupled to the second databus and is adapted to use a link active schedule to control interoperation of the field devices to execute the process. A backup scheduler is coupled to the second databus and is adapted to communicate with the primary scheduler and the plurality of field devices. Moreover, a processor in communication with the second databus is programmed to automatically store a backup copy of the link active schedule in the backup scheduler upon receipt of the link active schedule in the primary link active scheduler.

In accordance with yet another aspect of the invention, a communication scheduling system for use in a process control system having a master link active scheduler and a backup link active scheduler coupled to a databus includes a computer readable memory, a first storing routine stored on the memory that stores a link active schedule in a master link active scheduler, and an automatic transmission routine that automatically transmits the received link active schedule from the master link active scheduler over the databus to the backup link active scheduler upon receipt of the link active schedule in the master link active scheduler.

DESCRIPTION OF THE PREFERRED EMBODIMENTS

While a link active schedule backup system and method is described in detail in conjunction with a process control network that implements process control functions in a decentralized or distributed manner using Fieldbus devices, it should be noted that the invention can be used with process control networks that perform control functions using other types of field devices and communication protocols, including protocols that rely on other than two-wire buses and protocols that support only analog or analog and digital communications. More generally, the invention can be used in any other process control network that performs distributed control functions using scheduled communications. If desired, the link active scheduler system and method described herein can be used in process control networks that do not have distributed control functions but, instead, use a centralized controller or control scheme to control the devices therein.

Before discussing the details of the invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex.

The Fieldbus protocol is an all-digital, serial, two-way communication protocol that provides a standardized physical interface to a two-wire loop or bus interconnecting field equipment such as sensors, actuators, controllers, valves, etc. located in an instrumentation or process control environment of, for example, a factory or a plant. The Fieldbus protocol provides, in effect, a local area network for field devices within a process, which enables these field devices to interoperate to perform control functions at locations distributed throughout a process and to communicate with one another before and after the performance of these control functions to implement an overall control strategy.

Figure 1:
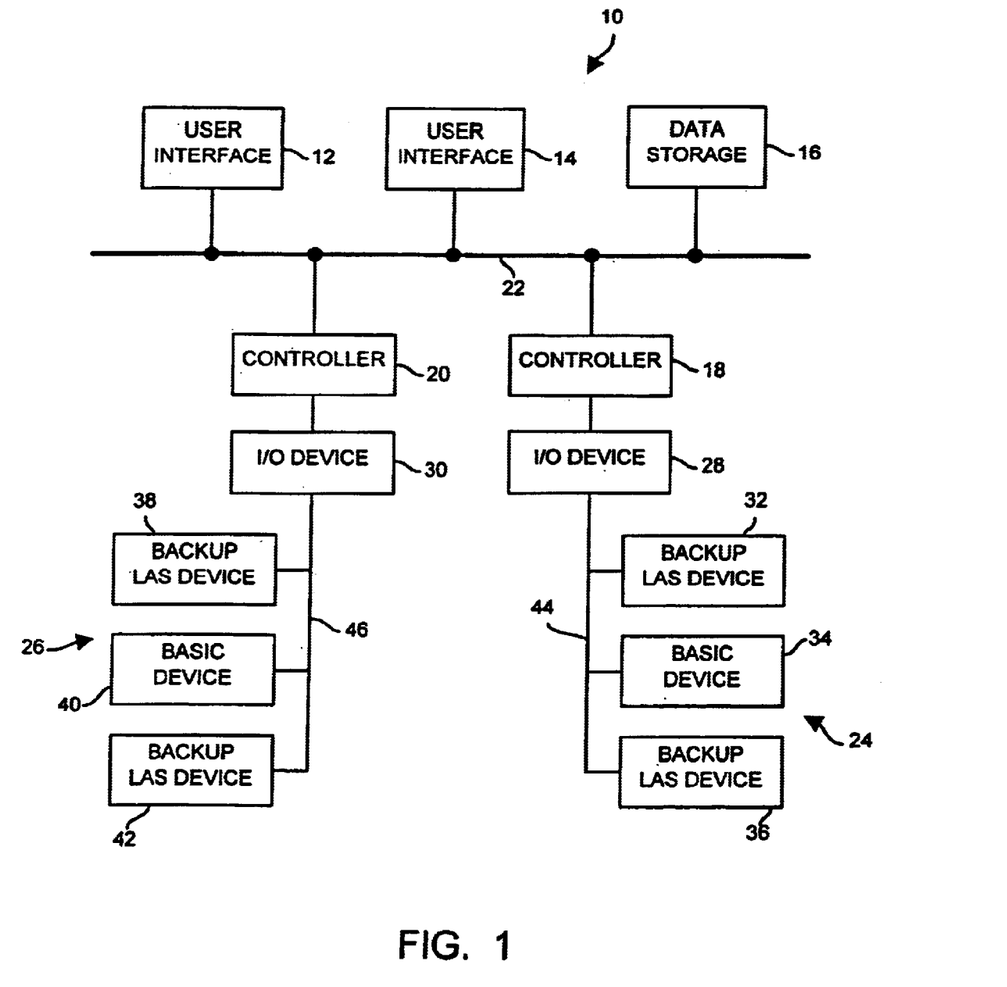
FIG. 1 is a schematic block diagram of an exemplary process control network having a master link active scheduler that automatically updates backup link active schedulers.

FIG. 1 illustrates an exemplary process control network 10 that uses, for example, Fieldbus field devices. The process control network 10 includes user interfaces 12, 14, which may be, for example, workstations connected to a number of other devices such as a data storage device 16 and one or more controllers 18, 20 via a system level databus 22. The system level databus 22 may be an Ethernet databus or any other databus suitable for the transmission of data.

The controllers 18, 20 may be traditional DCS controllers and may communicate with the user interfaces 12, 14 using a proprietary communication protocol, or in any other suitable manner, via the system level databus 22. For example, the controllers 18, 20 may send alarm and status information to the user interfaces 12, 14 and may additionally receive user commands/requests from the user interfaces 12, 14 via the system databus 22. The controllers 18, 20 may further include conventional control algorithms for use in controlling field devices that are connected to the controllers 18, 20 in any conventional or any other desired manner.

In particular, the controllers 18, 20 are in communication with one or more groups of smart field devices 24, 26 via I/O devices 28, 30. The field devices 3242 within each of the groups of smart field devices 24, 26 are coupled to non-proprietary databusses 44, 46 and communicate with one another and the I/O devices 28, 30, respectively, to execute one or more process control loops either in conjunction with or independently from the controllers 18, 20. The smart field devices 32–42 may be, for example, Fieldbus devices, in which case the non-proprietary databusses 44, 46 employ the Fieldbus signal protocol discussed in more detail below. However, other types of devices and protocols could be used as well.

While the smart field devices 32–42 are illustrated in FIG. 1 as being connected to the non-proprietary data busses 44, 46 in a standard bus-type connection, in which multiple devices are connected to the same pair of wires, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus that may be, for example, a junction box or a termination area in one of the field devices within a process control network.

The I/O devices 28, 30 provide a communication gateway or bridge between the devices within the groups of smart field devices 24, 26, which use the smart device communication protocol, and the controllers 18, 20, which do not necessarily use this protocol. Additionally, the I/O devices 28, 30 may operate as bus schedulers, referred to herein as master link active schedulers (LASs), to provide a synchronization/coordination function that allows interoperation of the smart field devices on the protocol busses 44, 46. If desired, however, other devices on the busses 44, 46 could operate as master LASs. In particular, the I/O devices 28, 30 or other devices acting as the master LAS maintain a timing schedule, referred to herein as a bus schedule or a link active schedule, to control the operation of and to synchronize the data communications between the smart field devices connected to each of the busses 44, 46.

Each of the smart field devices 32–42 is capable of communicating over the buses 44, 46 and is capable of independently performing one or more process control functions using data acquired by the field device from the process or from a different field device via communication signals on the busses 44, 46. Fieldbus devices are, therefore, capable of directly implementing portions of an overall control strategy that, in the past, were performed by a controller of a DCS.

Figure 2:
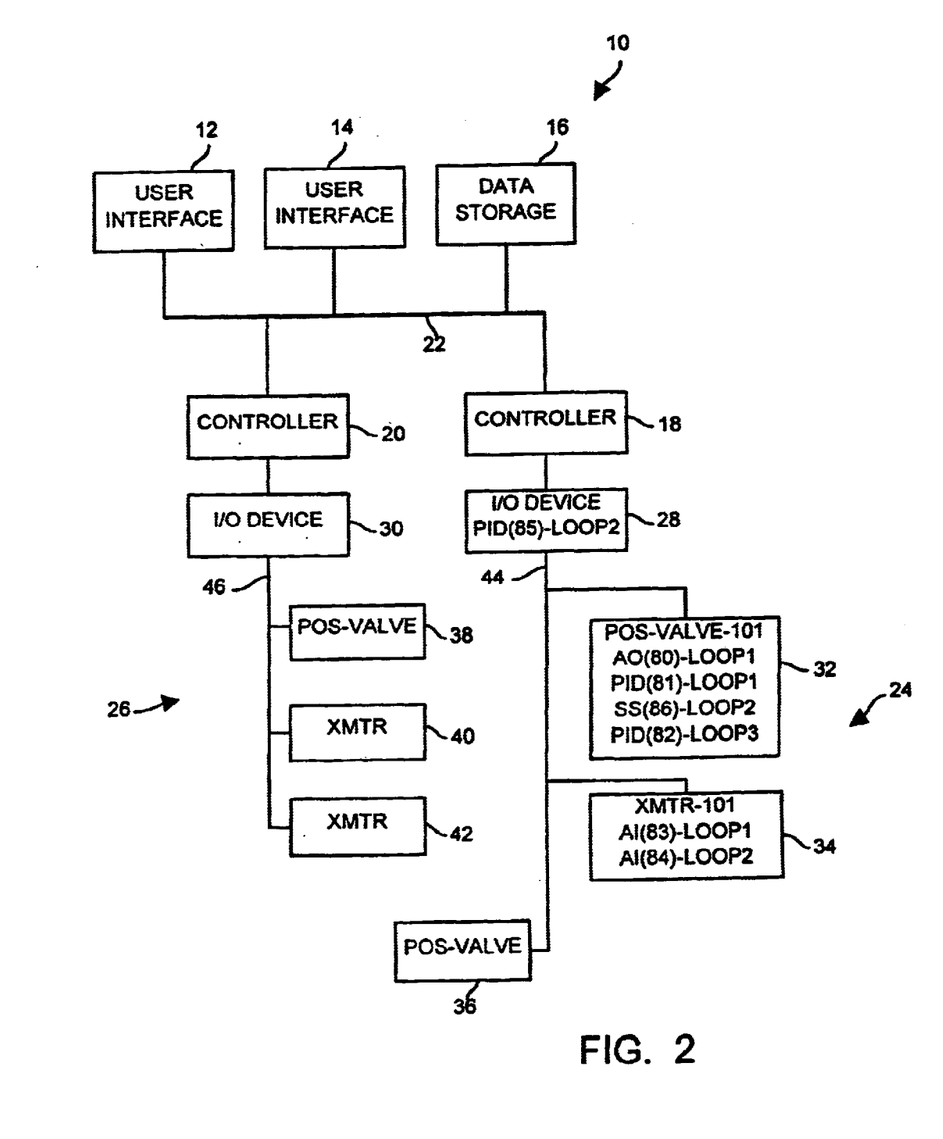
FIG. 2 is a schematic block diagram illustrating function blocks within some of the field devices of the process control network of FIG. 1.

Referring now to FIG. 2, a block diagram of the process control network 10 depicting the devices 32, 36, and 38 as positioner/valve devices and the devices 34, 40, and 42 as transmitters also illustrates the function blocks associated with the positioner/valve 32, the transmitter 34, and the I/O device 28. The positioner/valve 32 includes a number of function blocks including an analog output (AO) function block 80, two PID function blocks 81 and 82, and a signal select (SS) function block 86. The transmitter 34 includes two analog input (AI) function blocks 83 and 84, and the I/O device 28 includes a PID function block 85.

The different function blocks of FIG. 2 may operate together (by communicating over the busses 44, 46) in a number of control loops and the control loops in which the function blocks of the positioner/valve 32, the transmitter 34, and the I/O device 28 are located are identified in FIG. 2 by a loop identification block connected to each of these function blocks. Thus, as illustrated in FIG. 2, the AO function block 80 and the PID function block 81 of the positioner/valve 32 and the AI function block 84 of the transmitter 34 are connected within a control loop indicated as LOOP1, while the SS function block 86 of the positioner/valve 32, the AI function block 84 of the transmitter 34, and the PID function block 85 of the I/O device 28 are connected in a control loop indicated as LOOP2. The other PID function block 82 of the positioner/valve 32 is connected within a control loop indicated as LOOP3.

Figure 3:
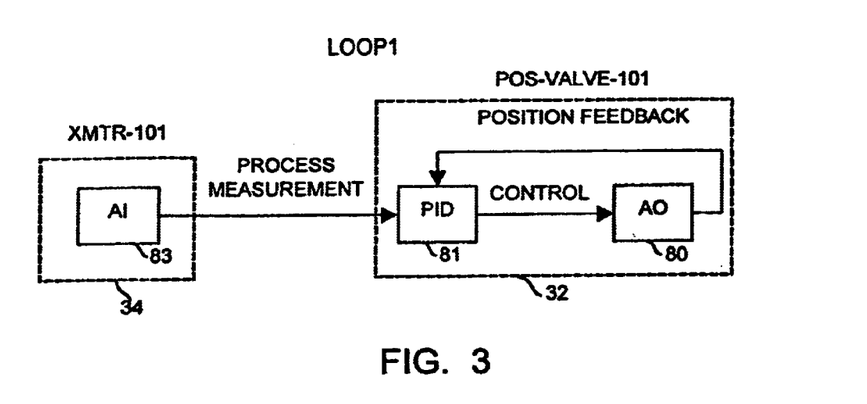
FIG. 3 is an exemplary control loop schematic for a process control loop within the process control network of FIG. 1.

The interconnected function blocks making up the control loop indicated as LOOP1 in FIG. 2 are illustrated in more detail in the schematic of this control loop depicted in FIG. 3. As can be seen from FIG. 3, the control loop LOOP1 is completely formed by communication links between the AO function block 80 and the PID function block 81 of the positioner/valve 32 and the AI function block 83 of the transmitter 34 (FIG. 2). The control loop diagram of FIG. 3 illustrates the communication interconnections between these function blocks using lines attaching the process and control inputs and outputs of these functions blocks. Thus, the output of the AI function block 83, which may comprise a process measurement or process parameter signal, is communicatively coupled via the bus 44 to the input of the PID function block 81 which has an output comprising a control signal that is communicatively coupled to an input of the AO function block 80. An output of the AO function block 81, which comprises a feedback signal indicating, for example, the position of the valve 32, is connected to a control input of the PID function block 81. The PID function block 81 uses this feedback signal along with the process measurement signal from the AI function block 83 to implement proper control of the AO function block 80. Of course, the connections indicated by the lines in the control loop diagram of FIG. 3 may be performed internally within a field device when, as with the case of the AO and the PID function blocks 80 and 81, the function blocks are within the same field device (e.g., the positioner/valve 32), or these connections may be implemented over the communication busses 44, 46 using, for example, standard Fieldbus synchronous communications. Of course, other control loops are implemented by other function blocks that are communicatively interconnected in other configurations and the function blocks of any loop may be in any desired device, such as, for example in the controllers 18, 20.

The Fieldbus protocol allows the devices (i.e., the function blocks, objects, etc. of a field device) to communicate across the busses 44, 46, using a standard set of message formats and describes the communication services, message formats, and protocol behaviors required to build messages to be placed onto the communication stack and provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to put communication relationships, known as virtual communication relationships (VCRs), associated with one or more objects of a device, into the correct state. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

To implement any control strategy using function blocks distributed throughout a process control network, the execution of the function blocks must be precisely scheduled with respect to the execution of other function blocks in a particular control loop. Likewise, communication between different function blocks must be precisely scheduled on the busses 44, 46 so that the proper data is provided to each function block before that block executes.

For communication to occur, one of the link master devices on each of the busses 44, 46 (for example, I/O devices 28 and 30) operates as a link active scheduler (LAS) which actively schedules and controls communication on the associated one of the busses 44, 46. The LAS for each of the busses 44, 46 stores and updates a communication schedule (a link active schedule) containing the times that each function block of each device is scheduled to start periodic (i.e., synchronous) communication activity on the busses 44, 46 and the length of time for which this communication activity is to occur. While there may be one and only one active LAS device on each of the busses 44, 46, other link master devices (such as the device 32 on the bus 44) may serve as backup LASs and become active when, for example, the current master LAS fails.

Generally speaking, communication activities over the busses 44, 46 are divided into repeating macrocycles, each of which includes one synchronous communication for each function block (having external links) active on any particular one of the busses 44, 46 and one or more asynchronous communications for one or more of the functions blocks or devices active on one of the busses 44, 46. To conserve bandwidth on the busses 44, 46 communications between two function blocks within a single device may not be published on the busses 44, 46 and may be accomplished using communication links that are completely internal to the device. A device may be active, i.e., send data to and receive data from the busses 44, 46, even if it is physically connected to a different one of the busses 44, 46 through coordinated operation of the I/O devices 28, 30 and the controllers 18, 20.

During each macrocycle on a particular protocol bus 44 or 46, each of the function blocks active on the particular bus executes, usually at a different, but precisely scheduled (synchronous) time and, at another precisely scheduled time, publishes its output data on the associated bus 44 or 46 in response to a compel data command generated by the appropriate master LAS. Preferably, each function block is scheduled to publish its output data shortly after the end of the execution period of the function block. Furthermore, the data publishing times of the different function blocks are scheduled serially so that no two function blocks on a particular one of the busses 44, 46 publish data at the same time. During the time that synchronous communication is not occurring, each field device is allowed, in turn, to transmit alarm data, view data, requests, etc. in an asynchronous manner using token driven communications. The execution times of each function block are stored in the management information base (MIB) of the device in which the function block resides while, as noted above, the times for sending the compel data commands to each of the devices on one of the busses 44, 46 are stored in the MIB of the master LAS device for that bus. These times are typically stored as offset times because they identify the times at which a function block is to execute or send data as an offset from the beginning of an "absolute link schedule start time," which is known by all of the devices connected to the busses 44, 46.

To effect communications during each macrocycle, the master LAS, for example, the I/O device 28 of the bus 44, sends a compel data command to each of the devices on the bus 44 according to the list of transmit times stored in the link active schedule. Upon receiving a compel data command, a function block of a device publishes its output data on the bus 44. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data by not incrementing a sequence number that is sent with the data.

After the master LAS has sent a compel data command to each of the function blocks on the bus 44 and during the times that function blocks are executing, the master LAS may cause asynchronous communication activities to occur. To effect asynchronous communication, the LAS sends a pass token message to a particular field device. When a field device receives a pass token message, that field device has full access to the bus 44 and can send asynchronous messages, such as alarm messages, trend data, operator set point changes, requested data, etc. until the messages are complete or until a maximum allotted "token hold time" has expired. Thereafter, the field device releases the bus 44 and the master LAS sends a pass token message to another device. This process repeats until the end of the macrocycle or until the master LAS is scheduled to send a compel data command to effect synchronous communication. Of course, depending on the amount of message traffic and the number of devices and blocks coupled to the bus 44, not every device may receive a pass token message during each macrocycle.

Figure 4:
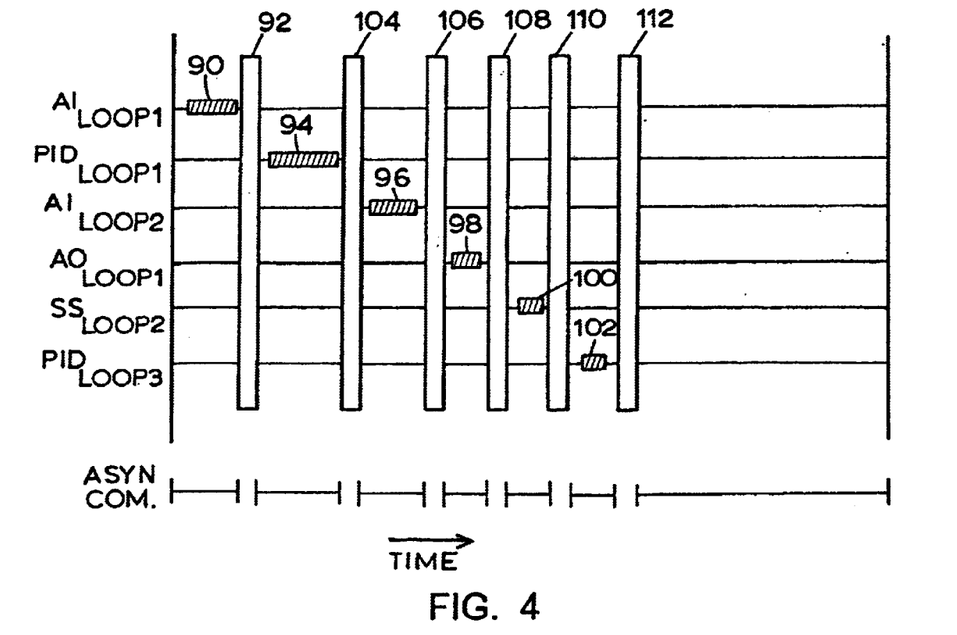
FIG. 4 is an exemplary timing schematic for a bus macrocycle within the process control network of FIG. 1.

FIG. 4 illustrates a timing schematic depicting the times at which function blocks on the bus 44 of FIG. 1 execute during each macrocycle of the bus 44 and the times at which synchronous communications occur during each macrocycle associated with the bus 44. In the timing schedule of FIG. 4, time is indicated on the horizontal axis and activities associated with the different function blocks of the positioner/valve 32 and the transmitter 34 (of FIG. 2) are illustrated on the vertical axis. The control loop in which each of the functions blocks operates is identified in FIG. 4 as a subscript designation. Thus $AI_{LOOP1}$ refers to the AI function block 83 of the transmitter 34, $PID_{LOOP1}$ refers to the PID function block 81 of the positioner/valve 32, etc. The block execution time of each of the illustrated function blocks is depicted by a cross-hatched box while each scheduled synchronous communication is identified by a vertical bar in FIG. 4.

Thus, according to the timing schedule of FIG. 4, during any particular macrocycle of the bus 44 (FIG. 1), the $AI_{LOOP1}$ function block executes first for the time period represented by the box 90. Then, during the time period indicated by the vertical bar 92, the output of the $AI_{LOOP1}$ function block is published on the bus 44 in response to a compel data command from the master LAS for the bus 44. Likewise, the boxes 94–102 indicate the execution times of the function blocks $PID_{LOOP1}$, $AI_{LOOP2}$, $AI_{Loop1}$, $SS_{LOOP2}$, and $PID_{LOOP3}$, respectively (which are different for each of the different blocks), while the vertical bars 106, 110 and 112 indicate the times that the function blocks $AI_{LOOP2}$, $SS_{LOOP2}$, and $PID_{LOOP3}$, respectively, publish data on the bus 44. The function blocks $PID_{LOOP2}$, and $AO_{LOOP2}$ are not published on the bus 44 because they both reside within the positioner/valve device 32.

As will be apparent, the timing schematic of FIG. 4 also illustrates the times available for asynchronous communication activities, which may occur during the execution times of any of the function blocks and during the time at the end of the macrocycle during which no function blocks are executing and when no synchronous communication is taking place on the bus 44. Of course, if desired, different function blocks can be intentionally scheduled to execute at the same time and not all function blocks must publish data on the bus if, for example, no other device subscribes to the data produced by a function block, or if, as noted above, the data can be communicated between function blocks within the same device using communication links that are internal to the device.

Fieldbus devices are able to publish or transmit data and messages over the busses 44, 46 using one of three virtual communication relationships (VCRs) defined in the Fieldbus access sublayer of the stack of each field device. A client/server VCR is used for queued, unscheduled, user initiated, one to one, communications between devices on the busses 44, 46. Such queued messages are sent and received in the order submitted for transmission, according to their priority, without overwriting previous messages. Thus, a field device may use a client/server VCR when it receives a pass token message from an LAS to send a request message to another device on the bus 44. The requester is called the "client" and the device that receives the request is called the "server." The server sends a response message when it receives a pass token message from the master LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated, one to many communications. For example, when a field device with an event or a trend report receives a pass token from the master LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the busses 44, 46 when the publisher device receives a compel data message from the master LAS, or from a subscriber device. The publisher/subscriber relationships are configured and are defined and stored within the Fieldbus access sublayer of the communication stack of each field device.

To assure proper communication activities over the busses 44, 46 each master LAS periodically sends a time distribution message to all of the field devices connected to the busses 44, 46, which enables the receiving devices to adjust their local data link time to be in synchronization with one another. Between these synchronization messages, clock time is independently maintained in each device based on its own internal clock. Clock synchronization allows the field devices to synchronize function block execution across the segment.

It is desirable to maintain backup copies of the link active schedules for the control loops/processes associated with each of the groups of field devices 24, 26 because, if the master LAS device (such as one of the I/O devices 28, 30) fails, then the interoperation of the field devices 24, 26 may fail, thereby resulting in failure of the associated control processes. Typically, one or more of the field devices 32–42 on each of the busses 44 and 46 is selected as a backup LAS device to maintain a backup copy of the link active schedule for each of the busses 44, 46.

It is also desirable for each master LAS (and other link master devices) on each bus to store a "live list," which is a list of all the devices that are connected to the data bus, i.e., all of the devices that are properly responding to a pass token message. The master LAS continually recognizes new devices added to a bus by periodically sending probe node messages to addresses that are not on the live list. In fact, in the Fieldbus protocol, each master LAS is required to probe at least one address after it has completed a cycle of sending pass token messages to all of the field devices in the live list. If a field device is present at the probed address and receives the probe node message, the device immediately returns a probe response message. Upon receiving a probe response message, the master LAS adds the device to the live list and confirms by sending a node activation message to the probed field device. A field device remains on the live list as long as that field device responds properly to pass token messages. However, a master LAS removes a field device from the live list if the field device does not, after three successive tries, either use the token or immediately return the token to the master LAS. When a field device is added to or removed from the live list, the master LAS broadcasts changes in the live list to all the other link master devices on the appropriate one of the data busses 44, 46 to allow each link master device to maintain a current copy of the live list.

The master LAS devices, for example, the I/O devices 28, 30 are preferably configured to automatically store a copy of the most current link active schedules in one or more of the backup LAS devices, such as devices 32, 38, and 42 of FIG. 1. This storage may be accomplished with reference to a backup LAS list and the live list that are stored in the master LAS devices. In particular, a user or system designer stores a backup LAS list, which identifies all of the backup LAS devices on a bus, in the master LAS at the time the control system is first put into operation. At the time the master LAS receives a backup LAS list, the master LAS may automatically send the list of backup link active scheduler devices to the backup link active scheduler.

Figure 5:
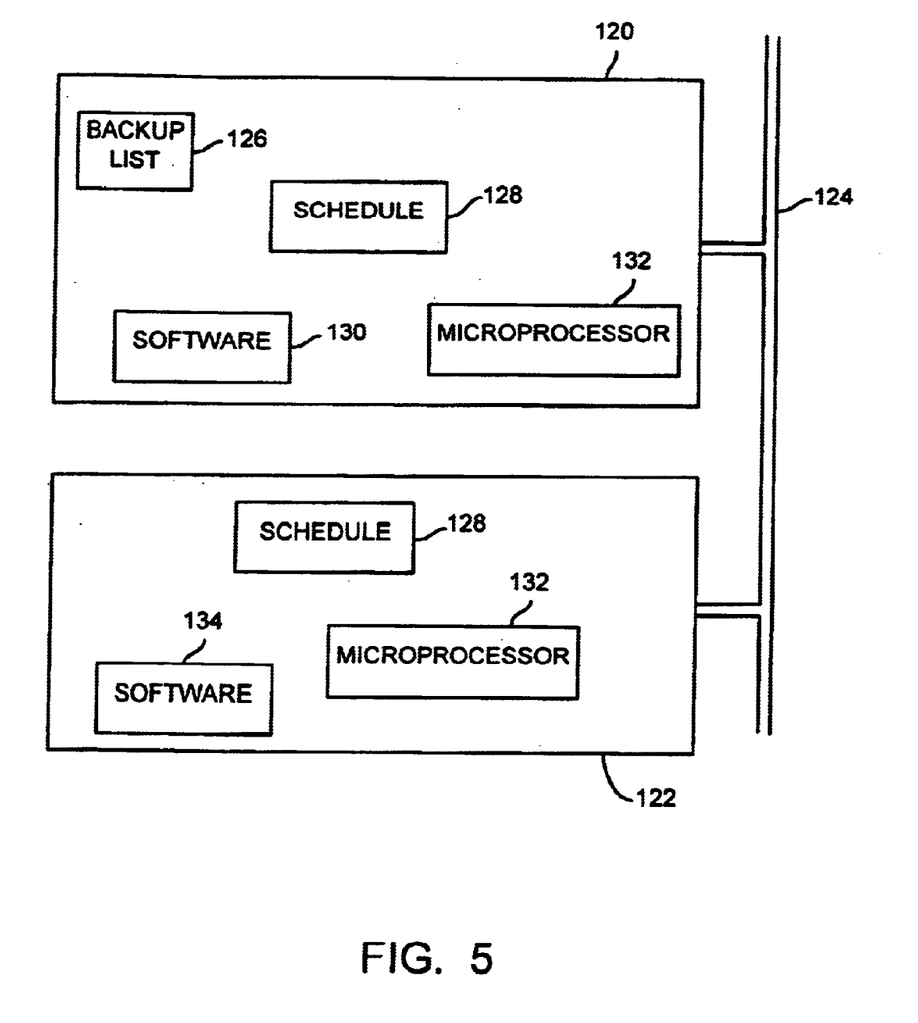
FIG. 5 is a block diagram of a system having a master link active scheduler that is capable of automatically downloading a link active schedule to a backup link active scheduler.

FIG. 5 illustrates a block diagram of a master LAS 120 that is capable of automatically downloading the most current link active schedule to each backup LAS device 122 via a protocol databus 124. The master LAS 120, which may be, for example, one of the I/O devices 28 or 30 of FIG. 1, includes a backup list 126 (which stores a list of the backup LAS devices on the bus 124), a link active schedule 128 for the bus 124, and downloading software 130, all stored in one or more memory devices (not shown) that are integral to the master LAS 120. The master LAS 120 also includes a microprocessor 132 that executes control algorithms and which enables the communication of information to and from the master LAS 120 via the databus 124.

Likewise, the backup LAS 122, which may be for example, the device 32 of FIG. 1, includes a link active schedule 128, software 134, and a microprocessor 132 that are similar or identical to those contained within the master LAS 120 described above. In operation, the master LAS 120 initially receives the backup list 126 and the schedule 128 via the databus 124, or from some other external source, in response to a user command to download and store the backup list 126 and the schedule 128 in the master LAS 120. After receiving a new version of the backup list 126 and/or the schedule 128, the downloading software 130 uses the backup list 126 to automatically update those backup LAS devices identified in the backup list 126 with the new schedule information. In particular, the downloading software 130 sends the new schedule using the communication protocol associated with the bus 124 to each of the backup LASs on the bus 124. If, for example, the bus 124 is using a Fieldbus protocol, a client/server VCR may be used to asynchronously communicate the new schedule over the bus 124.

Additionally, the software 130 uses the above-described live list feature to recognize when a backup device (stored in the backup list 126) is no longer communicating on the bus and, as a result, is no longer available for backup purposes. For example, the software 130 may periodically compare the live list to the backup list to determine if any backup LASs have dropped off the bus 124 and are, therefore, no longer available as backup LASs should the master LAS fail. If the master LAS 120 recognizes that a backup device from the backup list 126 is no longer on the live list (i.e., is not available for backup), the master LAS 120 may send a message communicating this fact to the user via the databus 124 or any other communication line. Additionally, if one or more of the link active schedules stored in the backup devices 32, 38, 42 cannot be loaded then the user may be notified as above via the databus 22 and the user interfaces 12, 14.

In operation, a failure of the master LAS 120 (FIG. 5) results in communication failure on the protocol bus 124 associated with the master LAS 120. The backup LAS 122 includes an activity timer (that may be implemented in the software 134 executed by the microprocessor 132) that detects/monitors communication activity on the protocol bus 124, and which is used to recognize a communication problem on the bus 124 such as that caused by a failure of the master LAS 120. If the communication failure is of sufficient duration, the activity timer of the backup LAS 122 will time-out and the backup LAS 122 will begin operation as the master LAS and take control of the communication on the bus 124. If more than one backup LAS is coupled to the bus 124, the backup LAS with the lowest address has the highest priority and becomes the new master LAS.

In view of the foregoing description, it can be appreciated that because the master LAS 120 automatically updates the backup LAS 122 with the most current version of the link active schedule, the reliability of a process control loop may thereby be greatly improved. Namely, a user is only required to download the link active schedule once to the master LAS 120, and does not have to remember to update the backup LAS 122 with the new schedule. As a result, the present invention assures that the backup LAS 122 will have a current link active schedule, and in the event that the master LAS 120 fails, the backup LAS 122 takes control of the bus 124 to properly control communications on the bus and any process control loops associated with the bus 124.

Those skilled in the art will recognize that methods of the above-described invention may be implemented using a various combinations of hardware and software. Generally, the methods of the invention may be efficiently implemented using a microprocessor to execute a number of software code segments or modules that are retrieved from a local computer readable memory. However, other combinations of hardware and software using, for example, algorithm specific integrated circuits (i.e., ASICs) or other types of hardware may be used to accomplish similar results without departing from the scope of the invention.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of providing a backup link active schedule for use in controlling communication in a process control system having a master link active scheduler that controls communication on a databus using a link active schedule and a backup link active scheduler that performs backup control of communication on the databus communicatively coupled directly together via the databus, and further including a controller communicatively connected to the databus, comprising the steps of:

providing process control signals to the databus from the controller to perform process control activities;

storing a link active schedule in a master link active scheduler wherein the link active schedule includes a communication timing schedule for the databus;

automatically transmitting the link active schedule from the master link active scheduler over the databus to the backup link active scheduler upon receipt of the link active schedule in the master link active scheduler apart from the process control signals; and storing the link active schedule in the backup link active scheduler.

2. The method of claim 1, further comprising the step of storing a list of backup link active scheduler devices associated with the databus in the master link active scheduler.

3. The method of claim 1, further comprising the steps of detecting when the backup link active scheduler is unavailable for storage of the link active schedule and notifying a user that the backup link active scheduler is unavailable for storage of the link active schedule.

4. The method of claim 1, further comprising the steps of detecting a failure to store the link active schedule in at least one backup link active scheduler and notifying a user of the detected failure to store the link active schedule in at least one backup link active scheduler.

5. The method of claim 1, wherein the step of automatically transmitting includes the step of transmitting using an open communication protocol.

6. The method of claim 1, wherein the step of automatically transmitting includes the step of transmitting using a Fieldbus communication protocol.

7. The method of claim 1, further comprising the step of recognizing that the backup link active scheduler is no longer communicating on the databus.

8. The method of claim 7, wherein the step of recognizing includes the step of comparing a live list to a backup list.

9. The method of claim 7, further comprising the step of notifying a user that the backup link active scheduler is no longer communicating on the databus.

10. A system for controlling communications on a databus using a link active schedule having a communication timing schedule for the databus, and further including a controller communicatively connected to the databus, comprising:

the controller providing process control signals to the databus to perform process control activities;

a master link active scheduler that controls communication on the databus using a link active schedule, the master link active scheduler having a memory that stores the link active schedule and a processor programmed to automatically transmit the link active schedule over the databus upon receiving the link active schedule; and a backup link active scheduler that performs backup communication control on the databus, the backup link active scheduler in communication via the databus with the master link active scheduler to receive the link active schedule transmitted from the master link active scheduler.

11. The system of claim 10, further comprising a list of backup link active scheduler devices stored in the memory.

12. The system of claim 11, wherein the processor is further programmed to send the link active schedule to the backup link active scheduler devices in the list of backup link active scheduler devices.

13. The system of claim 10, wherein the processor is further programmed to detect when the backup link active scheduler is unavailable for storage of the link active schedule and to notify a user that the backup link active scheduler is unavailable for storage of the link active schedule.

14. The system of claim 10, wherein the master link active scheduler and the backup link active scheduler are each adapted to transmit over the databus using an open protocol.

15. The system of claim 14, wherein the open protocol is the Fieldbus protocol.

16. The system of claim 10, wherein the backup link active scheduler is a field device.

17. A system for controlling a process, comprising:

a user interface coupled to a first databus;

a controller communicatively coupled to the user interface through the first databus;

an I/O device coupled to the controller and further coupled to a second databus, the controller providing process control signals to the second databus to perform process control activities;

a plurality of field devices coupled to the second databus, each of the field devices adapted to communicate with the I/O device over the second databus;

a primary scheduler coupled to the second databus and adapted to use a link active schedule to control interoperation of the field devices;

a backup scheduler coupled to the second databus and adapted to communicate with the primary scheduler and the plurality of field devices via the second databus to perform backup control of the interoperation of the field devices; and a processor associated with the primary scheduler and programmed to automatically store a backup copy of the link active schedule in the backup scheduler upon receiving the link active schedule.

18. The system of claim 17, wherein the second databus uses a Fieldbus communication protocol.

19. A communication scheduling system for use in a process control system having a master link active scheduler with a processor therein and a backup link active scheduler communicatively coupled to a databus, the master link active scheduler performing control of communications on the databus and the backup link active scheduler performing backup control of communications on the databus, and further including a controller communicatively coupled to the databus to send control signals via the databus, comprising:

a computer readable memory;

a first storing routine stored on the memory and adapted to be executed by the processor that stores a link active schedule having a communication timing schedule in the master link active scheduler; and an automatic transmission routine stored on the memory and adapted to be executed by the processor that automatically transmits the received link active schedule from the master link active scheduler apart from said control signals over the databus to the backup link active scheduler upon receipt of the link active schedule in the master link active scheduler.

20. The communication scheduling system of claim 19, wherein the automatic transmission routine is further adapted to receive and store a list of backup link active scheduler devices and to automatically send the list of backup link active scheduler devices to the backup link active scheduler.

21. The communication scheduling system of claim 19, further comprising a detecting routine stored on the memory and adapted to be executed by the processor that detects when the backup link active scheduler is unavailable for storage of the link active schedule.

22. The communication scheduling system of claim 21, further comprising a notifying routine stored on the memory and adapted to be executed by the processor that notifies a user when the backup link active scheduler is unavailable for storage of the link active schedule.

23. The communication scheduling system of claim 19, further comprising a detecting routine stored on the memory and adapted to be executed by the processor that detects a failure to store the link active schedule in the backup link active scheduler.

24. The communication scheduling system of claim 23, further comprising a notifying routine stored on the memory and adapted to be executed by the processor that notifies a user of the failure to store the link active schedule in the backup link active scheduler.

25. The communication scheduling system of claim 19, further comprising a detecting routine stored on the memory and adapted to be executed by the processor that detects when the backup link active scheduler is no longer communicating on the databus.

26. The communication scheduling system of claim 25, further comprising a notifying routine stored on the memory and adapted to be executed by the processor that notifies a user that the backup link active scheduler is no longer communicating on the databus.

* * * * *

UNITED STATES PATENT AND TRADEMARK OFFICE
CERTIFICATE OF CORRECTION

PATENT NO.     : 6,915,364 B1
DATED          : July 5, 2005
INVENTOR(S)    : Daniel D. Christensen et al.

It is certified that error appears in the above-identified patent and that said Letters Patent is hereby corrected as shown below:

Column 2,
Line 31, delete "is" and insert -- may --.

Column 4,
Line 62, delete "3242" and insert -- 32-42 --.

Column 9,
Line 4, delete "$AI_{LOOP1}$" and insert -- $AO_{LOOP1}$ --.
Line 9, delete "$AO_{LOOP2}$" and insert -- $AO_{LOOP1}$ --.

Column 12,
Line 4, delete "a".

Signed and Sealed this

Twentieth Day of December, 2005

JON W. DUDAS
*Director of the United States Patent and Trademark Office*